United States Patent
Hotter et al.

(10) Patent No.: US 12,098,297 B2
(45) Date of Patent: Sep. 24, 2024

(54) POLYMER-BASED BUILD MATERIAL FOR SELECTIVE SINTERING

(71) Applicant: EOS GmbH Electro Optical Systems, Krailling (DE)

(72) Inventors: Andreas Hotter, Rosenheim (DE); Stefan Paternoster, Andechs (DE); Heiko Pfisterer, Emmering (DE); Malin Gerg, Munich (DE); Thomas Mattes, Gilching (DE); Marius Christ, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 384 days.

(21) Appl. No.: 17/291,891

(22) PCT Filed: Nov. 7, 2019

(86) PCT No.: PCT/EP2019/080552
§ 371 (c)(1),
(2) Date: May 6, 2021

(87) PCT Pub. No.: WO2020/099236
PCT Pub. Date: May 22, 2020

(65) Prior Publication Data
US 2022/0010144 A1    Jan. 13, 2022

(30) Foreign Application Priority Data
Nov. 12, 2018   (DE) .......................... 102018219302.9

(51) Int. Cl.
*C09D 5/03*       (2006.01)
*B29C 64/153*     (2017.01)
(Continued)

(52) U.S. Cl.
CPC ............ *C09D 5/035* (2013.01); *B29C 64/153* (2017.08); *B33Y 70/00* (2014.12); *C08K 3/04* (2013.01);
(Continued)

(58) Field of Classification Search
CPC ........ C09D 5/035; C09D 177/02; C09D 7/67; C09D 7/61; B29C 64/153; B33Y 70/00;
(Continued)

(56) References Cited

U.S. PATENT DOCUMENTS

2007/0232753 A1\* 10/2007 Monsheimer .............. C08J 3/12
                                                         525/178
2007/0238056 A1   10/2007 Baumann et al.
(Continued)

FOREIGN PATENT DOCUMENTS

DE         19918981         2/2000
DE         4410046         11/2000
(Continued)

OTHER PUBLICATIONS https://www.palmerholland.com/Assets/User/Documents/Product/45965/7152/MITM10431.PDF, Safety Data Sheet by Orion Engineered Carbons May 8, 2019. (Year: 2019).\*
(Continued)

*Primary Examiner* — Ling Siu Choi
*Assistant Examiner* — Olga Lucia Donahue
(74) *Attorney, Agent, or Firm* — Polsinelli

(57) ABSTRACT

Plastic powder for use as a building material for manufacturing a three-dimensional object by layer-by-layer melting and solidification by hardening of the building material at the positions corresponding to the cross-section of the three-dimensional object in the respective layer by exposure to radiation, preferably by exposure to NIR radiation, wherein the plastic powder comprises a dry blend of poly-
(Continued)

mer-based particles and particles of a NIR absorber, wherein the NIR absorber comprises carbon black or is carbon black and wherein the weight percentage of carbon black in the total weight of polymer and carbon black particles is in the range of at least 0.02% and at most 0.45%, and/or wherein the carbon black has a mean primary particle diameter in the range of from 15 nm to 70 nm, preferably of at least 26 nm and/or at most 58 nm.

8 Claims, 3 Drawing Sheets

(51) Int. Cl.
| | |
|---|---|
| *B33Y 70/00* | (2020.01) |
| *C08K 3/04* | (2006.01) |
| *C09D 7/40* | (2018.01) |
| *C09D 7/61* | (2018.01) |
| *C09D 177/02* | (2006.01) |
| *B29K 77/00* | (2006.01) |
| *B29K 507/04* | (2006.01) |
| *B33Y 10/00* | (2015.01) |
| *B33Y 30/00* | (2015.01) |

(52) U.S. Cl.
CPC .............. *C09D 7/61* (2018.01); *C09D 7/67* (2018.01); *C09D 177/02* (2013.01); *B29K 2077/00* (2013.01); *B29K 2507/04* (2013.01); *B29K 2995/0046* (2013.01); *B29K 2995/0077* (2013.01); *B33Y 10/00* (2014.12); *B33Y 30/00* (2014.12); *C08K 2201/005* (2013.01); *C08K 2201/011* (2013.01)

(58) Field of Classification Search
CPC ............ B33Y 10/00; C08K 2003/2241; C08K 2201/005; C08K 2201/011; C08K 3/04
See application file for complete search history.

(56) References Cited

U.S. PATENT DOCUMENTS

| | | |
|---|---|---|
| 2008/0122141 A1 | 5/2008 | Bedal et al. |
| 2018/0155559 A1 | 6/2018 | Szczurek et al. |

FOREIGN PATENT DOCUMENTS

| | | |
|---|---|---|
| DE | 102004009234 | 9/2005 |
| DE | 102004012682 | 10/2005 |
| DE | 102004012683 | 10/2005 |
| DE | 102004062761 | 6/2006 |
| DE | 102007016656 | 10/2008 |
| DE | 102007024469 | 11/2008 |
| DE | 102008024281 | 12/2009 |
| DE | 102008024288 | 12/2009 |
| EP | 1740367 | 11/2009 |
| JP | 2010184412 | 8/2010 |
| JP | 2011021218 | 2/2011 |
| WO | 2005085326 | 9/2005 |
| WO | 2015091485 | 6/2015 |
| WO | 2018122142 | 7/2018 |

OTHER PUBLICATIONS https://dimacolor.en.made-in-china.com/product/hwmauzJAILKH/China-Raven-410-Pigment-Dimablack-7-Carbon-Black-Dispersion-Preparation-Paint-Coating-Ink.html (Year: 1998).*
PCT Search Report for Application No. PCT/EP2019/080552 dated Feb. 12, 2020, 2 pages.
Ferro-Plast S.R.L. "Carbon Black in Polvere Perline Per Materie Plastiche," Vimodrone, Italy, Feb. 4, 2020, 1 page; Vimodrone, Italy, www.ferroplast.com.
ISO 13320-1, 2009, 7 pages.
DIN EN ISO 725-9, 2009, 1 page.
ISO 527-1, 2019, 7 pages.
ISO 291, 2008, 2 pages.
ISO 60, 1977, 2 pages.

* cited by examiner

A.

B.

POLYMER-BASED BUILD MATERIAL FOR SELECTIVE SINTERING

TECHNICAL FIELD OF THE INVENTION

The present invention relates to a plastic powder (i.e. polymer powder) for use in a method operating in a layer-by-layer manner for the manufacture of three-dimensional objects in which selective areas of a respective powder layer are melted and re-solidified. It is further an object of the present invention to provide a method for manufacturing a three-dimensional object using the plastic powder according to the invention as a building material, a three-dimensional object manufactured from the powder according to the invention, a system for manufacturing three-dimensional objects according to the invention, and a method for the preparation of the plastic powder according to the invention.

BACKGROUND OF THE INVENTION

As is known, for example, from DE 44 10 046, a method for manufacturing a three-dimensional object can be carried out layer by layer by selective sintering using electromagnetic radiation with the use of an electromagnetic radiation source. In such a method, a three-dimensional object is manufactured layer by layer—according to the principle of "additive manufacturing"—by repeated application of powder layers, selective melting (partially or completely) at the positions corresponding to the cross-section of the object, and subsequent solidification of the melt. By melting the powder layer, the melt bonds with the previously melted layer.

FIG. 1 shows by way of example a laser sintering device with a laser beam and a deflection mirror, as is usual when using a $CO_2$ laser, by means of which a method for the layer-by-layer manufacture of a three-dimensional object can be carried out. As can be seen from FIG. 1, the device comprises a container 1. This container is open at the top and is confined at the bottom by a support 4 for carrying an object 3 to be formed. A working plane 6 is defined by the upper edge 2 of the container (or its side walls, respectively). The object is placed on the upper surface of the support 4 and is formed from a plurality of layers of a pulverulent building material being solidifiable by means of electromagnetic radiation and extending parallel to the upper side of the support 4. Herein, the support is movable in the vertical direction, i.e. parallel to the side wall of the container 1, by means of a height adjustment device. This allows the position of the support 4 to be adjusted relative to the working plane 6.

Above the container 1 or the working plane 6, an application device 10 is provided for applying the powder material 11, which is to be solidified, to the support surface 5 or a layer that has been solidified at last. Furthermore, an irradiation device in the form of a laser 7 is arranged above the working plane 6, which emits a directed light beam 8. This beam is deflected by a deflector 9, for example a rotating mirror, as a deflected beam 8' in the direction of the working plane 6. This arrangement is common for a laser-sintering system with a $CO_2$ laser. A control unit 40 enables the control of the support 4, the application device 10, and the deflection device 9. The elements 1 to 6, 10 and 11 are arranged within the machine frame 100.

In the course of the manufacture of the three-dimensional object 3, the powder material 11 is applied layer by layer to the support 4 or to a previously solidified layer, respectively, and is solidified by the laser beam 8' at the positions of each powder layer corresponding to the object. After each selective solidification of a layer, the support is lowered by the thickness of the next powder layer to be applied.

Compared to the system described above, there are many modifications of methods and devices for manufacturing a three-dimensional object (shaped body) by selective sintering using electromagnetic radiation that may also be used. For example, instead of a laser and/or a light beam, other systems might be used to selectively deliver electromagnetic radiation, such as mask exposure systems or the like. Laser diodes, which may be arranged in a row, for example, may also be used instead of a $CO_2$ laser.

As a building material, a powder with powder particles comprising a thermoplastic polymer material is often considered. The mechanical properties of the manufactured object can be influenced by a suitable selection of the polymer in the raw material. For example, polymers that lead to preferred mechanical material properties in the final object are described in DE 10 2008 024 281 A1 and DE 10 2008 024 288 A1. Likewise, it was described that the mechanical properties could be further improved by using additives such as fillers, reinforcing materials, additives, e.g. pigments. For example, carbon fibres, glass fibres, aramid fibres, carbon nanotubes, or additives that have a low aspect ratio (glass beads, aluminium grit, etc.) or mineral additives such as titanium dioxide could be incorporated into the polymer or copolymer-containing powder.

A possible disadvantage of the known sintering processes working according to the principle of "additive manufacturing" described as an example above using $CO_2$ lasers is the lack of flexibility with regard to the laser. In order to sinter plastic powder or plastic-coated particles, a $CO_2$ laser, which has a wavelength of 10600 nm, is usually used. An elaborate mirror system must be used to guide the laser beam across the build surface and the laser must be permanently cooled. The use of optical fibres is not possible. Nor is it possible to switch to cheaper lasers with a wavelength in the mid- or near-infrared range, in the visible light range, or in the ultraviolet range without additional measures, since such lasers do not melt plastics without suitable additives, or only to an insufficient extent.

This problem was at least partially solved in the German patent application DE 10 2004 012 683 A1 by adding absorbers to polymer-based powders. The absorbers have an absorption spectrum that can absorb wavelengths in the mid- or near-infrared range, the visible light range or the ultraviolet range. By exposing the absorbers to light, the heat developed in the absorber may be used to melt the polymer-based particles. However, it is known that additives mixed into laser sintering powders as a dry blend may have a negative influence on the laser sintering process (reduction of the process window, poorer z-bonding of the layers) and may thus lead to poor quality of the formed objects.

A disadvantage of the solution proposed in the German patent application DE 10 2004 012 683 A1 is that the process tends to instability. In particular, the process has only a small build/temperature window. Another serious disadvantage is that the three-dimensional objects manufactured in this way have inadequate mechanical properties.

SUMMARY OF THE INVENTION

Therefore, one object of the present invention is to provide an improved method and/or system for manufacturing a three-dimensional object by selectively solidifying the building material at the locations corresponding to the cross-section of the three-dimensional object in the respective layer by exposure to an NIR radiation. Preferably, it is aimed at the widest possible build/temperature window and good mechanical properties, in particular in terms of tensile strength, Young's modulus, and elongation at break. It is also an object of the invention to provide a powder for use as a building material in such an improved process, as well as a three-dimensional object manufactured by the advantageous method.

This object is solved by a plastic powder, a manufacturing process, a three-dimensional object, a manufacturing process, and a system.

According to a first aspect of the present invention, the plastic powder comprises a dry blend of polymer-based particles and particles of a NIR absorber, wherein the NIR absorber comprises or is carbon black, and wherein the weight percentage of the carbon black in the total weight of polymer-based particles and carbon black particles is in the range of at least 0.02% and at most 0.45%. Preferably, the weight percentage of the carbon black in the total weight of polymer-based particles and carbon black particles is at least 0.07% and/or at most 0.15%, particularly preferably at least 0.08% and/or at most 0.10%. The powder according to the invention is intended to be used in particular as a building material for manufacturing a three-dimensional object by selective solidification of the building material at the positions corresponding to the cross-section of the three-dimensional object in the respective layer by exposure to NIR radiation.

The term "solidifying" is to be understood as at least partial melting or melting with subsequent solidification or re-solidification of the building material. In the context of solidification, the term "selective" refers to localised irradiation at positions of a continuous layer that are to be solidified, while positions of the layer that are not to be solidified are not irradiated. In contrast to such selective consolidation is, for example, a technique in which no complete layer is spread, but the building material is spread only at points where consolidation is desired. In this case, irradiation may also be applied to areas that are not to be consolidated. Solidifying may therefore be understood as the layer-by-layer melting and subsequent solidification of the building material by hardening of the melt at the positions corresponding to the cross-section of the three-dimensional object in the respective layer by exposure to NIR radiation.

The term "near infrared (NIR) radiation" means electromagnetic radiation in the spectral range between visible light and mid-infrared and in particular from 780 nm to 3000 nm. The term "NIR absorber" accordingly denotes a substance or mixture of substances that at least partially absorbs NIR radiation. For the sake of readability, the following explanations refer to a substance as an NIR absorber. The same applies if a mixture of substances is used as an NIR absorber.

According to the invention, the NIR absorber may contain carbon black or it consists of carbon black, wherein it is preferred that the NIR absorber is carbon black and further NIR absorbers are not present or are present only to a small extent. The term "to a small extent" means that the ratio of the absorption of carbon black to the absorption of the further NIR absorbers in at least part of the NIR range (for example at 980±7 nm) is at least 2 or 3, preferably at least 4 or 5, further preferably at least 6 or 7 and in particular at least 8 or 9 or at least 10.

The term "dry mixture" is synonymous with the term "dry blend" and, according to the invention, denotes a mixture of the polymer-based particles and the particles of the NIR absorber. Optionally, the dry blend may additionally comprise one or more further additives, which are optionally introduced in the dry blend process.

The term "three-dimensional object" is used here synonymously with the term "shaped body". The term "polymer particles" is used herein synonymously for the term "polymer-based particles" and refers herein to particles comprising polymer described in more detail herein, preferably consisting thereof to the extent of at least 20% by weight, further preferably to the extent of at least 40% by weight, and in particular to the extent of at least 60% by weight. The remaining components may essentially comprise fillers.

According to a second aspect of the present invention, which may optionally be combined with the first aspect of the invention, the plastic powder comprises a dry blend of polymer-based particles and particles of a NIR absorber, wherein the NIR absorber in turn comprises carbon black or is carbon black, and wherein the carbon black has a primary particle diameter in the range of from 15 nm to 70 nm, preferably of at least 26 nm and/or at most 58 nm, and in particular of (42±16) nm.

The three-dimensional objects manufactured with the powder according to the invention show unexpected advantages during manufacture as well as in the manufactured three-dimensional objects. By carefully selecting the concentration range of the specific NIR absorber disclosed here, it is achieved that the process is stable, and at the same time that the mechanical properties, especially with regard to tensile strength, Young's modulus, and elongation at break of the manufactured three-dimensional object are very good. It turned out that these advantages are significantly achieved only by the combination of the NIR absorber containing or consisting of carbon black and the proportion of carbon black. The experiments carried out by the inventors show that with lower proportions of carbon black, the mechanical properties are lower, especially with regard to tensile strength, Young's modulus, and elongation at break; conversely, with higher proportions, the process becomes more unstable and thus the product properties deteriorate (smaller temperature window and smaller processing range). With the specifically adjusted proportion of carbon black in relation to the polymer-based material, a balance was thus unexpectedly achieved between opposing effects in additive plastic powders.

The preferred embodiment is a dry blend of polymer-based particles and the particles of the NIR absorber, i.e. the particles of the NIR absorber have not been incorporated into the polymer-based particles, for example via a melt or via joint precipitation from a solution or in any other way.

The advantages according to the invention and further preferred embodiments are illustrated below.

In a preferred embodiment of the invention, the carbon black has a primary particle diameter in the range of 15 nm to 70 nm, preferably of at least 26 nm and/or at most 58 nm, particularly preferably the carbon black is industrial carbon black with a particle size of (42±16) nm. Advantageously, by this measure, the process stability is further improved. Furthermore, improvements in the fluidisability of the plastic powder and the coating quality as well as a constant coating behaviour may be achieved. Coating quality is defined as a uniformly dense coating of the surface without areas with visibly lower bulk density, regardless of whether there is powder or a previously melted building material under the coated powder layer. Constant coating behaviour refers to stable coating behaviour over the duration of an entire construction job, possibly over several hours. A build job refers to the building of a job, wherein a job is the compilation of positioned and parameterised three-dimensional objects in the software.

The term "primary particle diameter", as distinguished from the diameter of an agglomerate or secondary particles, refers to the particle size of an originary, non-agglomerated particle. This means that an agglomerate consists of many primary particles, which represent the smallest, non-divisible unit of the agglomerate. Starting from agglomerates, primary particles may be obtained by treating a sample in an ultrasonic bath. Preferably, the primary particle diameter refers to the mean diameter. For the purposes of the present invention, the primary particle diameter can be determined according to ASTM D3849, in particular via morphological characterisation using transmission electron microscopy (TEM) according to ASTM D3849.

Surprisingly, it has been found in the context of the invention that the mentioned improvements are related to the primary particle diameter, essentially independent of the extent or degree to which the primary particles of the carbon black used have been agglomerated in their original state or in the process of blending with the polymeric particles.

For the purpose of determining the primary particle diameters, for example a LEO 912 Omega: 120 kV TEM instrument with a Proscan Slow Scan CCD 1024×1024 pixel camera and a 460 mesh copper grid with carbon film is suitable. Image analysis may be performed using Olympus Soft Imaging Solutions "analySIS". For sample preparation, 8 mg of a sample may be dispersed in one millilitre of isopropanol for 5 min in an ultrasonic bath. From this, a few drops may be taken and dispersed again in one millilitre of isopropanol for 5 min in an ultrasonic bath. Afterwards, a drop of the solution may be dropped onto a copper grid. The microscopic examination may be performed at different magnifications. Preferably, the examination may be performed at a microscope magnification of 2000 times (including post-magnification of the camera, the magnification is 40000 times). Optionally, a calibration check may be performed using a line grating grid with defined line spacing and/or a qualification test based on the TEM surface.

In a preferred embodiment of the invention, the NIR absorber is homogeneously distributed in the dry mixture and/or the plastic powder. For example, a light microscopic examination is suitable for assessing the homogeneity. In particular, for the purposes of the present invention, a distribution is considered "homogeneous" if in a plurality (e.g. 2, 3, 4, 5, 6, etc.) of random samples the smallest NIR absorber concentration deviates from the largest NIR absorber concentration by less than 30%, preferably less than 20%, more preferably less than 10%. Preferably, the samples are taken from a mixture of at least 1 g, more preferably at least 5 g.

This preferably avoids a spatially different absorption of the NIR radiation. The process stability is increased and the result is a three-dimensional object with improved mechanical properties.

The powder according to the invention is obtainable by mixing the polymer-based particles with the particles of the NIR absorber and, if necessary, further additives in a mixing step in the appropriate mixing ratio, so that the specified proportion by weight is adjusted. The mixing process is expediently carried out in a one-step procedure by:
  (i) providing the polymer-based particles and the particles of the NIR absorber; and
  (ii) dry mixing of at least the polymer-based particles and the particles of the NIR absorber.

For this purpose, for example, a container mixer from the company Mixaco CM150-D with standard blade design—1 bottom scraper and 1 dispersion blade (blade with a diameter of 400 mm)—is suitable, with which a two-stage mixing with 2 min at 516 rpm and 4 min at 1000 rpm may be carried out.

The mixing process may alternatively be carried out with several mixing steps (multi-stage process):
  (i) providing a first dry mixture (so-called master batch) by dry mixing of at least polymer-based particles and carbon black particles with a first proportion of carbon black particles,
  (ii) addition of further polymer-based particles to the first dry mixture to obtain a second dry mixture with a second proportion of carbon black particles which is lower than the first proportion,
  (iii) optionally further separate addition steps of in each case further polymer-based particles to the second and optionally further dry mixture(s) to obtain in each case increasingly further reduced proportions of carbon black particles. Optionally, the dry mixture may be sieved at least once in at least one of the steps (i) and (ii) and the optional step (iii) and/or after completion of the addition steps, preferably through a sieve of mesh size 125 μm. The mixing process in one stage or in several stages is carried out with the proviso that, after completion of the addition step (ii) or addition steps (iii), the proportion by weight of carbon black in the total weight of polymer-based particles and carbon black particles is in the range of at least 0.02% and at most 0.45%, preferably at least 0.07% and/or at most 0.15%, particularly preferably at least 0.08% and/or at most 0.10%.

Surprisingly, it has been found that the homogeneity is better with the single-stage process than with the multi-stage process. Accordingly, the single-stage process is the preferred embodiment among the two alternatives. The invention thus turns away from providing the plastic powder by means of a master batch process and rather towards providing the entire amount of plastic powder in a single process step, i.e. in a single batch process. The advantages of the single batch process include, in addition to a more homogeneous distribution of the NIR absorber in the powder, in particular a simpler and more cost-efficient process, since only one step has to be carried out.

In a preferred embodiment of the invention, in the CIE L*a*b* colour model, the lightness value (L* value) of the plastic powder, measured spectrophotometrically, is at most 75.00.

In a preferred embodiment of the invention, the carbon black is industrial carbon black. Industrial carbon black (EC number 215-609-9, CAS number 1333-86-4) is carbon black produced specifically as an industrial base material. According to its purpose, industrial carbon black is a modification of carbon with a high surface-to-volume ratio and is mainly used as a filler and as a black pigment. Preferably, the C content in quantitative elemental analysis of the carbon black, especially industrial carbon black, is at least 96%.

Alternatively or additionally, mixtures of plastic powder with industrial carbon black have a power consumption of less than 200 mJ, preferably less than 170 mJ, in particular less than 140 mJ, when powder analysis is carried out by means of a rheometer at an aeration of 1.0 mm/s. Due to this property(ies), a further significant improvement in process stability is achieved compared to other types of carbon black.

The power consumption is preferably determined according to ASTM D 7891. For this purpose, for example, the Freeman FT4 Powder Rheometer (manufacturer: Freeman Technology; software: designation C740) may be used. Air is injected through the bottom of a cylindrical vessel. Powder is filled into the vessel and the power consumption of a stirrer is measured. The power consumption of the stirrer is used as a criterion at an air speed ("aeration") of 1.0 mm/s. The vessel has the following dimensions: 50 mm×260 ml (e.g. Split Vessel, No. 8329, designation C2001). As a stirring tool, one with a diameter of 48 mm is used (e.g. Blade Assembly, designation C211). The filling quantity into the cylindrical vessel is 160 ml. The maximum shear rate ("tip speed") is 20 mm/s for the stirring tool used (diameter 48 mm). Aeration is performed in five steps from 0.0 to 2.0 mm/s at a helical angle of 5° and a shear rate of 20 mm/s.

In principle, the present invention is not limited to specific polymer-based plastics. Suitable polymer bases may be selected from the group consisting of homopolymers, copolymers, and polyblends (also known as polymer blends). A polyblend (also known as a "polymer-blend") is understood to be a mixture of two or more different polymers. A polyblend may be a single-phase polyblend (homogeneous polyblend) or a multi-phase polyblend (heterogeneous polyblend). In the case of a multi-phase polyblend, several glass transitions are typically observed by means of differential scanning calorimetry. Furthermore, in a multiphase polyblend, multiple melting peaks corresponding to the melting points of the individual phases can be observed by means of differential scanning calorimetry.

The polymer may be selected from polyaryletherketone (PAEK), polyarylethersulfone (PAES), polyamides, polyesters, polyethers, polylactides (PLA), polyolefins, polystyrenes, polyphenylene sulfides, polyvinylidene fluorides, polyphenylene oxides, polyimides, polyetherimides, polycarbonates, and copolymers including at least one of the foregoing polymers or monomer units thereof, and polymer blends of one or more of the foregoing polymers or copolymers thereof, wherein the selection is not limited to the above polymers and copolymers and polymer blends thereof. The term "polymers" may also include oligomers having a cyclic or ring-shaped molecular structure. An example of such an oligomer is CBT (cyclic butylene terephthalate) for the preparation of PBT (polybutylene terephthalate).

Suitable PAEK polymers and copolymers, for example, are selected from the group consisting of polyether ether ketone (PEEK), polyether ketone ketone (PEKK), polyether ketone (PEK), polyether ether ketone ketone (PEEKK), polyether ketone ether ketone ketone (PEKEKK), polyaryl ether ether ketone (PEEEK), and copolymers including at least one of the aforementioned polymers.

Suitable polyamide polymers or copolymers may be selected from the group consisting of polyamide 6/6T, polyamide elastomers such as polyether block amides such as PEBAX-based materials, polyamide 6, polyamide 66, polyamide 11, polyamide 12, polyamide 612, polyamide 610, polyamide 1010, polyamide 1012, polyamide1212, polyamide PA6T/66, PA4T/46, and copolymers including at least one of the aforementioned polymers. Suitable polyester polymers or copolymers may be selected from the group consisting of polyalkylene terephthalates (e.g. PET, PBT) and copolymers thereof.

Suitable polyolefin polymers or copolymers may be selected from the group consisting of polyethylene and polypropylene. Suitable polystyrene polymers or copolymers may be selected from the group consisting of syndiotactic and isotactic polystyrenes. Suitable polyimide polymers or copolymers may be selected from the group consisting of polyarylamide, polybismaleinimide, and in particular polyetherimide.

In the context of the invention, polyamide polymers or copolymers are preferred, in particular polyamide 12, polyamide 11, and/or polyamide 1012 and/or a copolymer including at least one of the foregoing polymers or monomer units thereof, and/or at least one polymer blend comprising at least one of said polymers or copolymers.

In one embodiment of the invention, the polymer-based particles comprise as polymer material polymers or copolymers or blends of PAEK, polyamide or polyetherimide, wherein the PAEK is preferably PEEK, PEKK, PEK, PEEKK, PEKEKK, and/or PEEEK and the preferred polyamide is polyamide 12 and/or polyamide 11. Furthermore, the three-dimensional objects made of these polymeric materials meet the high demands made with respect to mechanical stress.

The present invention is also suitable for use with polyblends.

With regard to the particle size of the polymer-based particles, there are no restrictions beyond those customary in the field of laser sintering. Suitable average particle sizes d50 are at least 10 μm, preferably at least 20 μm, particularly preferably at least 30 μm and/or at most 150 μm, preferably at most 100 or 90, particularly preferably at most 80 μm, especially at least 40 and/or at most 70 μm. The determination of the mean grain size d50 is preferably carried out according to ISO 13320-1 (wet). For example, a CILAS 1064 can be used as the instrument.

Within the scope of the present invention, further suitable additives may in principle be added to the dry mixture in order to impart advantageous properties to the plastic powder or to the three-dimensional object manufactured therefrom, or in order to make use of certain advantageous properties of such additives in the manufacturing process. However, in order to make the most of the advantages of the present invention, it is preferred that the dry mixture comprises at least one or more additives which reflect (in the proportion by weight and particle size used) at most 70%, 60% or 50%, preferably at most 40%, 30% or 20%, and in particular at most 15%, 10% or 5% of the NIR radiation. This ensures that the NIR radiation in the plastic powder is available to the NIR absorber for heat generation and is not reflected unused. Since diode lasers deliver significantly less energy than standard lasers, the powder can only be processed in this way at all and the energy saving may be used as an advantage.

From the context described above, it is clear that in one embodiment of the invention, the plastic powder may well comprise reflective particles having a surface that at least partially reflects the NIR radiation. By this measure, on the one hand, the advantages associated with certain substances reflecting in the IR range and, at the same time, the effects associated with the present invention can be exploited.

For example, titanium dioxide, known as a white pigment, acts as such a reflective particle. The use of titanium dioxide has unexpected advantages, particularly in the context of the present invention. This will be described below.

As described at the beginning, the present invention provides for the use of NIR absorbers to increase absorption in the NIR wavelength range (e.g. <1 μm). The inventors found that carbon black has a very high absorption capacity and the ability to efficiently convert the absorbed energy into heat. In the case of a universally applicable material, the amount of carbon black should be as small as possible so that the brightest possible component may be manufactured.

This makes the component more suitable for subsequent colouring, especially with light colours.

In the case of plastics, natural products with brownish off-white are called natural-coloured. When using natural-coloured plastics in a mixture with carbon black, the inventors noticed that the components made from them had an inhomogeneous colour impression. The components appear "stained".

Surprisingly, it was found that components with a much more homogeneous colour impression could be produced if $TiO_2$ was mixed into the natural-coloured plastic beforehand.

Thus, by adding titanium dioxide, components with a homogeneous colour may be obtained even when using small amounts of carbon black. Accordingly, the reflective particles preferably comprise $TiO_2$. Preferably, the reflective particles are substantially formed of $TiO_2$.

Preferably, the weight percentage of the reflection particles in the total weight of the plastic powder is between 0.5% and 15.0%, preferably at least 0.5% and/or at most 5%, in particular at least 0.5% and/or at most 2%.

Another aspect of the present invention is a method for the preparation of the plastic powder according to the invention. The preparation comprises at least the following steps:
(i) providing the polymer-based particles and the particles of the NIR absorber and optionally further additives; and
(ii) dry mixing at least the polymer-based particles and the particles of the NIR absorber and optionally the further additives.

Optionally, after step (ii), packaging of the polymer powder may be carried out, preferably with exclusion of moisture.

In a preferred embodiment, the polymer-based particles are mixed with the particles of the NIR absorber and optionally further additives in a one-step process in the desired mixing ratio, so that the specified weight proportion is set. However, the mixing process may also be carried out as described above with several mixing steps (multi-stage process). As also explained above, the homogeneity is better in the single-stage process than in the multi-stage process.

In another preferred embodiment, the polymer-based particles are provided together with the reflective particles, which preferably comprise $TiO_2$, and are dry-mixed with the particles of the NIR absorber.

Conventional powders are typically mixed with a flow aid such as fumed silica. Surprisingly, the carbon black was found to act as flow aid. Since the carbon black acts as flow aid, there is no need to add a particular flow aid to the claimed powder. Accordingly, in one embodiment, no additional flow aid is added to the plastic powder (i.e. only carbon black acts as anti-caking agent).

Another aspect of the present invention is a three-dimensional object manufactured by selectively solidifying a pulverulent building material at the locations corresponding to the cross-section of the three-dimensional object in the respective layer by the exposure to radiation, preferably by the exposure to NIR radiation. A plastic powder according to the invention served as the building material.

NIR radiation is not absolutely necessary, but preferred. In principle, the powder may also be processed by other layering methods and then unexpectedly offers the same advantages.

By using the plastic powder according to the invention as a building material, the following effects result in addition to the aforementioned advantages, which also represent a preferred embodiment of the invention. Accordingly, in a preferred embodiment, the three-dimensional object has at least one and preferably a combination of two or all of the following defined properties according to EN ISO 527:
(i) tensile strength at least 40 MPa, preferably at least 48 MPa;
(ii) Young's modulus at least 1600 MPa; preferably at least 1700 MPa;
(iii) Elongation at break at least 2.5%; preferably at least 3.0%.

These values apply in particular to three-dimensional objects made of polyamide 12 manufactured with laser diodes arranged in a line.

Another aspect of the present invention is a method for manufacturing a three-dimensional object by selectively solidifying a building material in powder form at the locations corresponding to the cross-section of the three-dimensional object in the respective layer by exposure to radiation, preferably NIR radiation. According to the invention, the plastic powder described above is used as the building material. This can be at least partially melted and subsequently re-solidified by the action of electromagnetic radiation, for example specifically in a wavelength or wavelength range located in the NIR, in particular at 980±10 nm and/or 940±10 nm and/or 810±10 nm and/or 640±10 nm.

In order to make the process more economical and/or environmentally friendly, part of the unsolidified building material left over from a previous manufacturing cycle ("used powder") may be reused in a subsequent cycle. For this purpose, the used powder is mixed with virgin powder in a predetermined ratio. In a preferred embodiment, the building material thus comprises a proportion of used powder, which has previously remained as unsolidified building material during the manufacture of a three-dimensional object, and a proportion of virgin powder, which has not previously been used in the manufacture of an object. Preferably, the proportion of virgin powder is at most 70% by weight, in particular at most 60%, 50%, or even 40% by weight.

Another aspect of the present invention provides a system for manufacturing three-dimensional objects by selectively solidifying the powdered building material according to the invention at the locations corresponding to the cross-section of the three-dimensional object in the respective layer by exposure to radiation, preferably NIR radiation. According to the invention, the system comprises at least one radiation source designed to emit electromagnetic radiation, in particular specifically in a wavelength or wavelength range located in the NIR, a processing chamber designed as an open container with a container wall, a support located in the processing chamber, wherein the processing chamber and the support are movable relative to each other in the vertical direction, a storage container, and a recoater movable in the horizontal direction. The storage container is at least partially filled with the plastic powder of the invention as building material.

Suitable process or system parameters are selected for the layer-by-layer melting of the plastic powder according to the invention. In addition to the proportion of the NIR absorber to be adjusted, in particular the layer thickness, the laser power, and the exposure speed are specifically selected.

In a preferred embodiment of the invention, the electromagnetic radiation is specifically emitted in the NIR range within a window of not more than 50 nm ($\lambda 2-\lambda 1 \leq 50$ nm), preferably not more than 40 nm, further preferably not more than 30 nm and in particular not more than 20 nm. This makes it possible for the plastic powder according to the invention to comprise further substances which would interfere in a first sub-range of the NIR range due to their absorption or reflection capability. By selecting a relatively narrow wave range outside the first sub-range, the interfering influence may be reduced or prevented.

In a preferred embodiment of the invention, the radiation source emits electromagnetic radiation specifically at one or more wavelengths in the range 500-1500 nm, in particular at one or more of the following wavelengths: 980±10 nm and/or 940±10 nm and/or 810±10 nm and/or 640±10 nm. Preferably, the radiation source emits at 980±7 nm.

In a preferred embodiment of the invention, the radiation source comprises at least one laser, preferably one or more laser diodes. The laser diodes may be arranged in a row or staggered. It is also possible to arrange the laser diodes in a 2-dimensional array. It may be an edge emitter. Preferably it is a surface emitter (VCSEL or Philips-VCSEL). High construction speeds may be achieved by line exposure. In addition, the use of laser diodes enables high efficiency and reduces energy costs.

Suitable laser diodes usually operate with a power of between 0.1 and 500 watts, preferably at least 1.0 watt and/or at most 100 watts. The focus of the laser beam may have a radius of between 0.05 mm and 1 mm, preferably of at least 0.1 mm and/or at most 0.4 mm. The exposure speed, i.e. the speed of the laser focus relative to the build plane, is typically between 10 mm/s and 10000 mm/s, preferably at least 300 mm/s and/or at most 5000 mm/s.

In the context of the present invention, the terms "comprising" or "containing" and grammatical variations thereof have the following meanings: In one embodiment, further elements may be included in addition to those mentioned. In another embodiment, substantially only the mentioned elements are included. In other words, in addition to their conventional meaning, the terms may in a particular embodiment be synonymous with the term "consisting essentially of" or "consisting of".

DETAILED DESCRIPTION OF THE EMBODIMENTS

Figure 1:
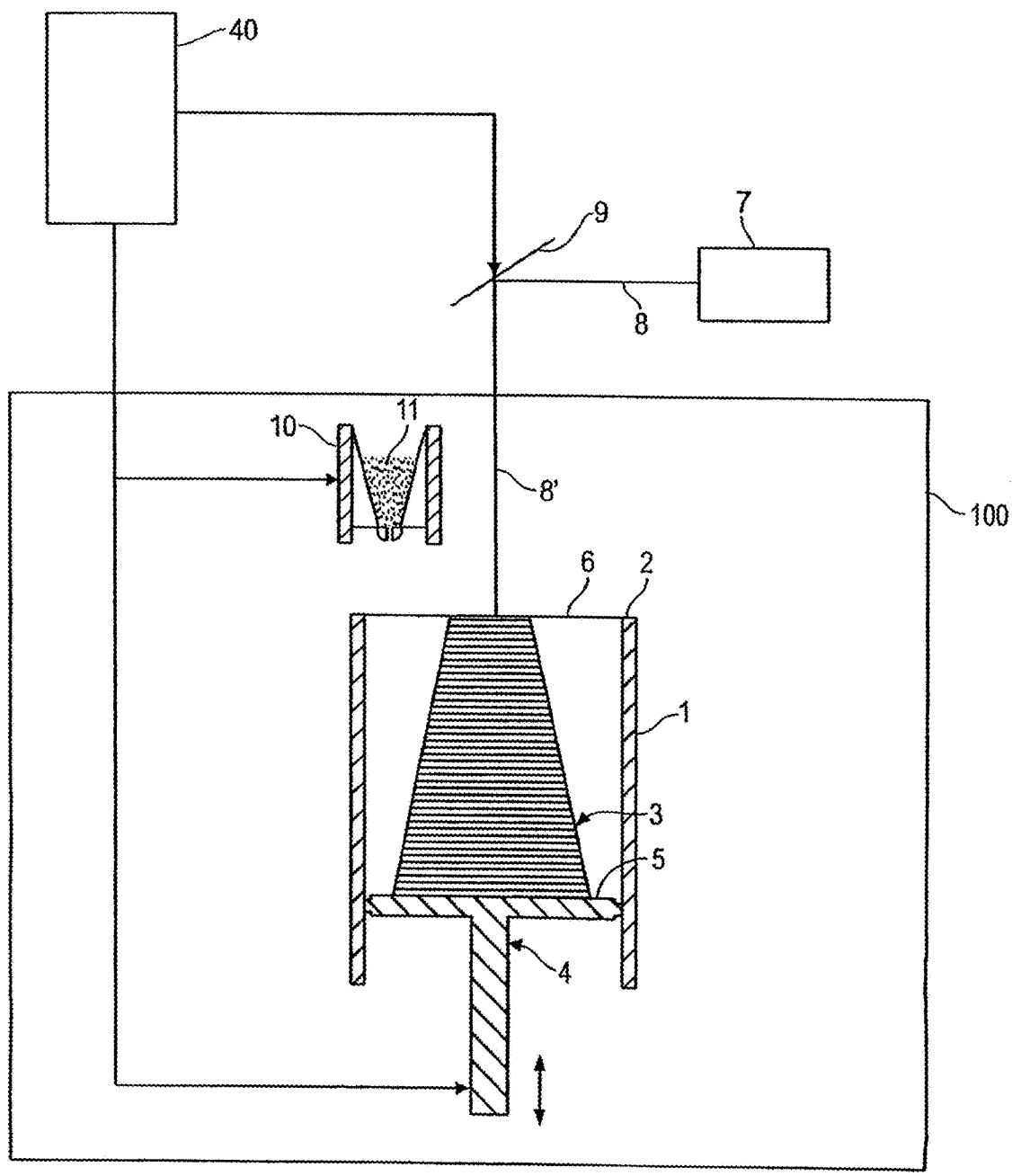
FIG. 1 shows by way of example a conventional laser sintering device for the layer-by-layer manufacture of a three-dimensional object.

The following methods are indeed suitable for determining certain properties of the objects according to the invention and were used in the experiments described below. They represent preferred methods for characterising certain properties of the articles according to the invention.

Tensile strength, Young's modulus, and elongation at break were determined in accordance with EN ISO 527, using test specimens of type 1BB. The conditioning state has relevant influences on the measurement results of the mechanical properties such as tensile strength, Young's modulus, and elongation at break. The mechanical properties of the test specimens were determined in dry condition, wherein the test took place a maximum of 3 hours after unpacking of the components. According to ISO 291, a temperature of (23±2) ° C. and a relative humidity of (50±10) % is used as preferred test climate for the determination of the mechanical properties. This test climate should be maintained when determining the mechanical properties. According to EN ISO 527-1, the test speeds should be agreed between the interested parties. A test speed of 50 mm/s was used.

The determination of the process reliability was based on the following criteria:

Fluidisability of the powder according to the invention is necessary in the recoating unit so that sufficient powder can be applied to the entire build area.

A uniformly dense coating of the area without zones with visibly lower bulk density, regardless of whether there is powder or a previously melted building material under the coated powder layer.

Stable coating behaviour over the duration of an entire construction job over several hours. A build job refers to the building of a job, wherein a job is the assembly of positioned and parameterised three-dimensional objects in the software.

A sufficiently large temperature window to tolerate inhomogeneity of the temperature distribution in the build area.

The following examples are for illustrative purposes and are not to be understood as restrictive. They define further preferred embodiments of the invention.

EXAMPLES

Example 1: Mechanical Properties in Dependence on the Concentration of Carbon Black In this experiment, the mechanical properties of test specimens were investigated for which the building material, i.e. plastic powder, differed in the proportion by weight of carbon black in the total weight of the mixture of carbon black and polymer-based material. In this example, the carbon black was Monarch® 570 and the polymer-based material was PA 2201 from EOS GmbH.

For this purpose, homogeneous mixtures were first prepared by physically mixing polymer-based particles and carbon black particles in the mixing ratio given in Table 1 and then used as building material in a selective laser sintering process on two different test facilities.

In an experiment not described in detail here, it was confirmed that the building material according to the invention can in principle be used on a conventional laser sintering machine equipped with a $CO_2$ laser source, such as an EOS P 396 from the company EOS Electro Optical Systems, with the standard settings described by the manufacturer. In the present experiment, a light source comprising NIR laser diodes was used instead of a $CO_2$ laser. For further details on the hardware and suitable settings, reference is made to European patent application EP14824420.5, published as EP 3 079 912. Subsequently, the mechanical properties were determined according to the described procedures.

The mechanical properties were determined as described below. The test method and the component dimensions of the test specimens are specified in the EN ISO 527 standard for the tensile testing. The materials testing machine TC-FR005TN.A50, dossier no.: 605922 from the company Zwick with the software TestExpert II V3.6 is suitable for this purpose. In the standardised tensile test, test results such as Young's modulus [MPa] and tensile strength [MPa] were determined.

The results are presented in the following Table 1.

TABLE 1

Determination of the mechanical properties:

| Concentration carbon black [wt. %] | Tensile strength [MPa] (building direction ZYX building direction ISO ASTM 52921) | Young's modulus [MPa] (building direction ZYX according to ISO ASTM 52921) | Elongation at break [%] (building direction ZYX according to ISO ASTM 52921) |
|---|---|---|---|
| 0.030 | 23.0 | 1100 | 2.3 |
| 0.050 | 38.3 | 1724 | 3.04 |
| 0.060 | 41.4 | 1743 | 3.23 |
| 0.075 | 46.7 | 1892 | 3.45 |
| 0.090 | 49.1 | 1659 | 4.21 |

In the test series, it has been shown that the use of a mixture of a dry blend with approximately 0.04 to 0.45 wt. % carbon black provides surprisingly better overall results compared to blends with other carbon black contents.

At lower concentrations the mechanical properties (tensile strength, Young's modulus, elongation at break) are lower, at higher concentrations the process becomes more unstable (smaller temperature window/smaller processing range).

Example 2: Improvement of Mechanical Properties Compared to Compounds Manufactured With a Multi-Stage Mixing Process In this experiment, the mechanical properties of a three-dimensional object according to the invention were compared with a three-dimensional object for the manufacture of which a mixture of 75 wt. % "PA 2200" and 25 wt. % "PA 2202 black" was used, two commercially available building materials based on the polymer type PA 12, wherein PA 2202 black contains carbon black. The building material according to the invention contained 0.09 wt. % carbon black (in this case Monarch® 570) mixed with plastic particles (in this case polyamide type PA 12 with the trade name PA 2201 from EOS GmbH).

The test specimens were manufactured and tested according to Example 1. The results are shown in Tab. 2 below.

TABLE 2

Comparison of the mechanical properties of a three-dimensional object according to the invention and a three-dimensional object made of a multi-stage mixed building material.

| Test material | Tensile strength [MPa] (building direction XZY according to ISO ASTM 52921) | Young's modulus [MPa] (building direction XZY according to ISO ASTM 52921) | Elongation at break [%] (building direction XZY according to ISO ASTM 52921) |
|---|---|---|---|
| PA 2201 + Monarch ® 570 | 48.76 | 1731 | 15.02 |
| PA 2200 + PA 2202 black | 47.18 | 1604 | 12.72 |

| Test material | Tensile strength [MPa] (building direction ZYX according to ISO ASTM 52921) | Young's modulus [MPa] (building direction ZYX according to ISO ASTM 52921) | Elongation at break [%] (building direction ZYX according to ISO ASTM 52921) |
|---|---|---|---|
| PA 2201 + Monarch ® 570 | 46.38 | 1726 | 5.47 |
| PA 2200 + PA 2202 black | 39.31 | 1665 | 3.21 |

In the test series, it has been shown that the use of a blend of PA with Monarch® 570 is significantly more process reliable and leads to improved mechanical properties than the use of a blend of PA 2200 and PA 2202 black.

Example 3: Process Reliability as a Function of the Primary Particle Diameter of Carbon Black Blends of polymer-based powder and different carbon black types were prepared. The proportion of the carbon black types in the total weight of the mixture was 0.09 percent by weight in each case. The polymer-based particles were identical in all mixtures and in this case were made of polyamide 12 with the trade name PA 2201 from EOS GmbH. Various commercial products containing industrial carbon black were used as carbon black types. These differed in the following properties, among others: primary particle size, BET surface area according to EN ISO 60, oil absorption number, pH value, manufacturing method, and ash content.

The mixtures were homogeneously mixed and used as building material in a laser sintering process. The process reliability was determined and the results presented in Tab. 4 below.

TABLE 3

Reliability of the laser sintering process when processing mixtures of polymer-based powder and different types of carbon black.

| Commercial name of carbon black | Primary particle diameter [nm] (Data provided by the supplier, not determined in accordance with the standard.) | Process reliability | Mean primary particle diameter (values measured according to ASTM D3849) |
|---|---|---|---|
| Monarch ® 570 | 21 | very good +++ | (46 ± 12) nm |
| Mogul L | 24 | very good +++ | (44 ± 14) nm |
| Spezialschwarz 4 | 25 | very good +++ | (42 ± 13) nm |
| Printex ® XE-2B | 30 | very good +++ | (37 ± 10) nm |
| Printex ® 200 | 47 | good ++ | |
| Printex ® G | 51 | poor -- | |
| Flammruß 101 | 95 | poor -- | |
| Arosperse 15 | 280 | very poor --- | |

Compared to other types of carbon black, which differ significantly from the particle size of approx. 15 to 50 nm, a significantly improved process stability can be seen, which was characterised in particular by better fluidisability of the plastic powder, constant coating behaviour, and better coating quality.

Example 4: Mechanical Properties Depending on the Type of Carbon Black Used

In this experiment, the mechanical properties of test specimens manufactured according to Example 1 were investigated. The mechanical properties were determined as described in Example 1. The results are shown in the following tables 4 and 5.

TABLE 4

Determination of the mechanical properties in the XZY direction of three-dimensional objects made from compounds of PA 2201 from EOS GmbH and different types of carbon black.

| Commercial name of carbon black | Tensile strength [MPa] (building direction XZY according to ISO ASTM 52921) | Young's modulus [MPa] (building direction XZY according to ISO ASTM 52921) | Elongation at break [%] (building direction XZY according to ISO ASTM 52921) |
|---|---|---|---|
| Monarch ® 570 | 48.76 | 1731 | 15.02 |
| Mogul L | 46.60 | 1614 | 17.19 |
| Spezialschwarz 4 | 48.06 | 1652 | 12.68 |

TABLE 5

Determination of the mechanical properties in the ZYX direction of three-dimensional objects made from PA 2201 blends and various carbon black types.

| Commercial name of carbon black | Tensile strength [MPa] (building direction ZYX according to ISO ASTM 52921) | Young's modulus [MPa] (building direction ZYX according to ISO ASTM 52921) | Elongation at break [%] (building direction ZYX according to ISO ASTM 52921) |
|---|---|---|---|
| Monarch ® 570 | 46.38 | 1726 | 5.47 |
| Mogul L | 41.58 | 1722 | 4.24 |
| Spezialschwarz 4 | 47.01 | 1847 | 5.18 |

In the test series, it was shown that in the compounds with the highest process reliability, the use of a mixture of PA 2201 with Monarch® 570 at the same concentration leads to an even better component quality (mechanical properties: tensile strength, Young's modulus, elongation at break) than the use of other carbon black types. Components made from compounds with Spezialschwarz 4 were also good in terms of mechanical properties (tensile strength, Young's modulus, elongation at break), but had inferior surfaces.

The determination of the primary particle diameters according to TEM examination in accordance with ASTM D3849 showed (46±12) nm and (44±14) nm for Monarch® 570 and (42±13) nm, (37±10) nm for Spezialschwarz 4.

Example 5: TiO$_2$-Additivated Plastic Particles in a Dry Blend With Carbon Black In this experiment, the optical properties of test specimens were compared, both of which were manufactured from plastic powder according to the invention (VESTOSINT® 1125 white). The plastic powders differed in that one contained titanium dioxide (VESTOSINT® 1125 white) while the other was free of titanium dioxide (PA 2201). The titanium dioxide content is believed to be around 1 wt. %.

Figure 2:
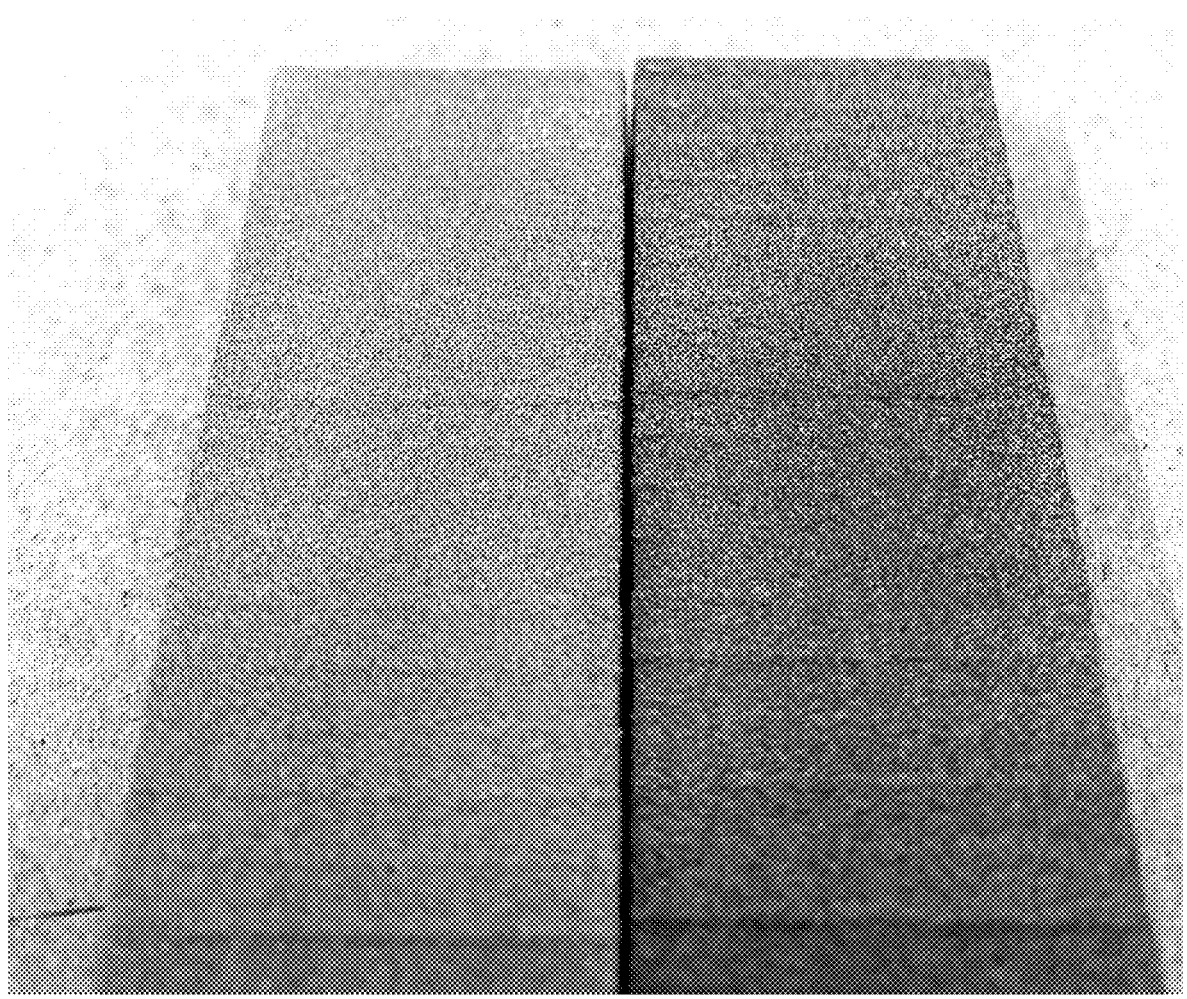
FIG. 2 shows a three-dimensional object according to the invention (right component) compared to a three-dimensional object according to a preferred embodiment of the invention (left component). The plastic powder from which the left-hand component was built contained titanium dioxide.
Figure 3:
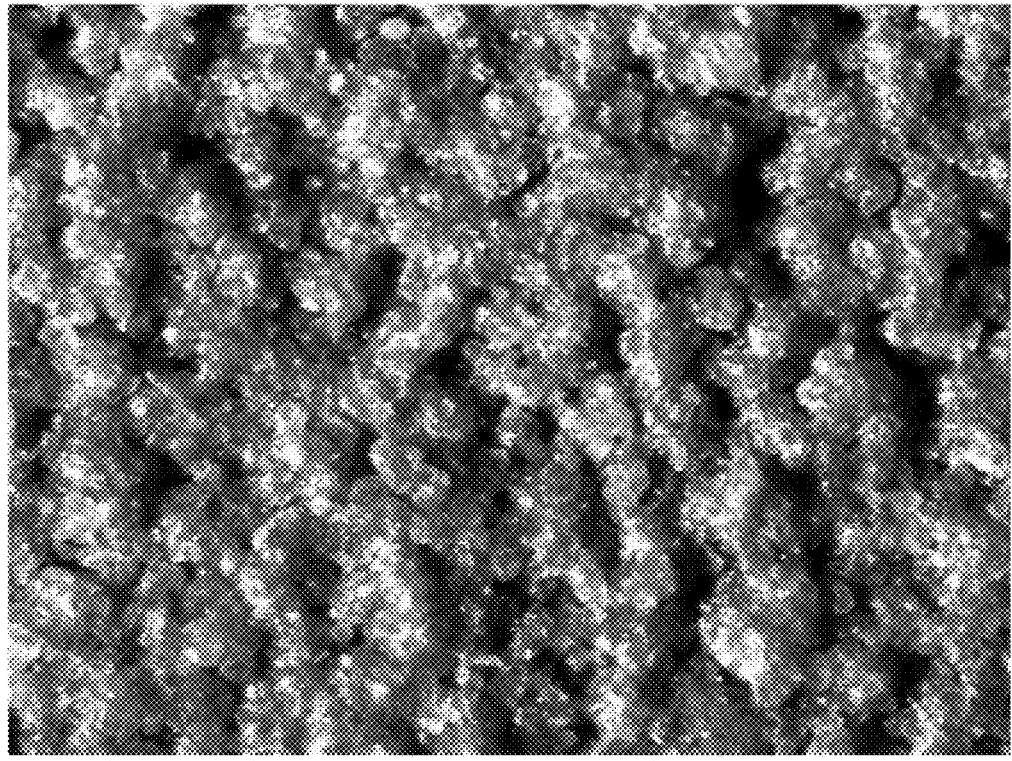
FIG. 3 shows a light microscopic magnification of the component surface of the components of FIG. 2. A: left component of FIG. 2; B: right component of FIG. 2.
Figure 3:
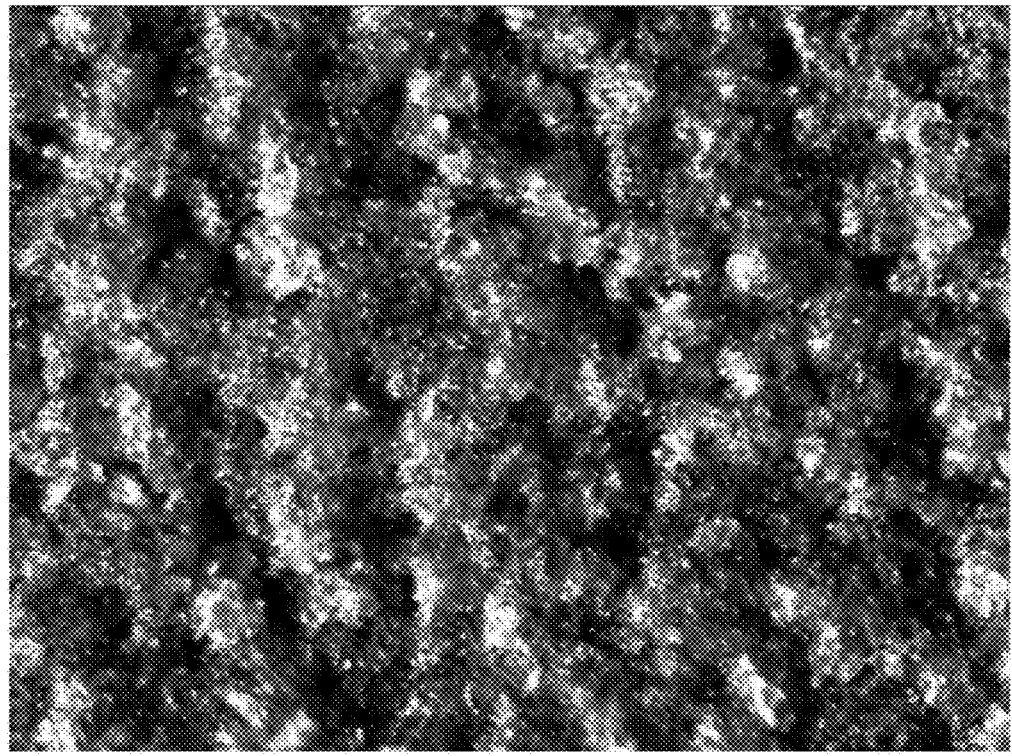

The results are shown in FIGS. 2 and 3.

In FIGS. 2 and 3 it can be seen that when using the natural-coloured plastic PA 2201 (i.e. without titanium dioxide) in a mixture with carbon black, an inhomogeneous colour impression is obtained in the objects processed from it. The components appear "blotchy" (FIG. 2, component on the right; FIG. 3B). In experiments with VESTOSINT® 1125 white, in contrast, which contains the white pigment TiO$_2$, it was possible to manufacture components with an even appearance, an extremely homogeneous shade and colour uniformity (FIG. 2, component on the left, FIG. 3A).

The invention claimed is:

1. A plastic powder for use as a building material for additively manufacturing a three-dimensional object by selectively solidifying the building material at positions corresponding to a cross-section of the three-dimensional object in the respective layer by exposure to near infrared radiation, wherein the plastic powder comprises:
    a dry mixture of polymer-based particles and particles of a near infrared absorber,
    wherein the near infrared absorber comprises carbon black;
    wherein the weight percentage of the near infrared absorber in a total weight of the plastic powder is in the range of 0.02% and 0.45%; and
    wherein the plastic powder comprises reflection particles having a surface which at least partially reflects the near infrared radiation, and wherein the reflection particles comprise TiO$_2$.

2. The plastic powder according to claim 1, wherein the weight percentage of the near infrared absorber in the total weight of the plastic powder is at least 0.07% and/or at most 0.15%.

3. The plastic powder according to claim 1, wherein the plastic powder comprises a dry mixture of polymer-based particles and particles of a near infrared-absorber and the near infrared-absorber comprises carbon black, wherein the carbon black has an average primary particle diameter in the range of from 15 nm to 70 nm.

4. The plastic powder according to claim 1, wherein in the CIE L*a*b* color model a lightness value (L* value) of the plastic powder, measured spectrophotometrically, is at most 75.00.

5. The plastic powder according to claim 1, wherein:
    the carbon black is amorphous industrial carbon black (definition according to EC number 215-609-9, CAS number 1333-86-4); and/or
    a C content of the carbon black is more than 96% in quantitative elemental analysis.

6. The plastic powder according to claim 1, wherein in the powder analysis of the plastic powder by means of a rheometer at aeration 1.0 mm/s, the power consumption is at most 200 mJ.

7. The plastic powder according to claim 1, wherein the polymer-based particles comprise as polymer material at least one polymer selected from the group consisting of polyaryletherketone (PAEK), polyarylether sulfone (PAES), polyamide, polyester, polyether, polylactide, polyolefin, polystyrene, polyphenylene sulfide, polyvinylidene fluoride, polyphenylene oxide, polyimide, polyetherimide, polycarbonate and/or at least one copolymer which includes at least one of the preceding polymers or their monomer units, and/or at least one polymer blend comprising at least one of the polymers or copolymers.

8. A plastic powder for use as a building material for additively manufacturing a three-dimensional object by selectively solidifying the building material at positions corresponding to a cross-section of the three-dimensional object, wherein the plastic powder comprises:
    polymer-based particles;
    particles of a near infrared absorber dry-mixed with the polymer-based particles, wherein the near infrared absorber comprises at least carbon black, has a weight percentage in a range of 0.02% to 0.45% of a total weight of the plastic powder, and has a primary particle diameter in the range of at least 26 nm to at most 58 nm; and
    reflection particles having a surface which at least partially reflects the near infrared radiation, and wherein the reflection particles comprise TiO$_2$.

* * * * *